(12) United States Patent
Harada et al.

(10) Patent No.: US 10,920,803 B2
(45) Date of Patent: Feb. 16, 2021

(54) MONITORING DEVICE

(71) Applicant: DENSO CORPORATION, Kariya (JP)

(72) Inventors: Toshikazu Harada, Kariya (JP); Atusi Sakaida, Kariya (JP); Toshihisa Taniguchi, Kariya (JP); Norio Gouko, Kariya (JP); Keiji Okamoto, Kariya (JP); Keita Saitou, Kariya (JP)

(73) Assignee: DENSO CORPORATION, Kariya (JP)

( * ) Notice: Subject to any disclaimer, the term of this patent is extended or adjusted under 35 U.S.C. 154(b) by 317 days.

(21) Appl. No.: 16/092,164

(22) PCT Filed: Apr. 7, 2017

(86) PCT No.: PCT/JP2017/014447
§ 371 (c)(1),
(2) Date: Oct. 8, 2018

(87) PCT Pub. No.: WO2017/175849
PCT Pub. Date: Oct. 12, 2017

(65) Prior Publication Data
US 2020/0325919 A1     Oct. 15, 2020

(30) Foreign Application Priority Data
Apr. 8, 2016 (JP) .............................. JP2016-078339

(51) Int. Cl.
*F15B 15/28*       (2006.01)
*F15B 19/00*       (2006.01)
(Continued)

(52) U.S. Cl.
CPC ...... *F15B 15/2807* (2013.01); *F15B 15/2815* (2013.01); *F15B 19/005* (2013.01);
(Continued)

(58) Field of Classification Search
CPC ............. F15B 15/2807; F15B 15/2815; F15B 19/005; F15B 2211/6336; F15B 2211/6343; F15B 15/28; G01D 3/08
See application file for complete search history.

(56) References Cited

U.S. PATENT DOCUMENTS 5,198,761 A * 3/1993 Hashimoto ............. F15B 15/28
                                              324/207.12
2015/0144171 A1    5/2015 Taniguchi et al.
2017/0213953 A1    7/2017 Taniguchi et al.

FOREIGN PATENT DOCUMENTS

JP    H07276377 A    10/1995
JP    2005330837 A   12/2005
(Continued)

*Primary Examiner* — F Daniel Lopez
*Assistant Examiner* — Daniel S Collins
(74) *Attorney, Agent, or Firm* — Harness, Dickey & Pierce, P.L.C.

(57) ABSTRACT

An air cylinder includes a tubular cylinder and a piston which is moved by pressure of a fluid supplied to a chamber provided inside the cylinder. A monitoring device includes a heat flux sensor and a detection part. The heat flux sensor is provided to the cylinder and detects heat flux that flows between inside and outside of the cylinder due to compression or expansion of the fluid in the chamber caused in accordance with the movement of the piston. The detection part detects the moving state of the piston based on the output signal of the heat flux sensor.

11 Claims, 10 Drawing Sheets

(51) Int. Cl.
*G01D 3/08* (2006.01)
*G01K 5/44* (2006.01)
*H01H 3/16* (2006.01)

(52) U.S. Cl.
CPC .............. *G01D 3/08* (2013.01); *G01K 5/44* (2013.01); *H01H 3/16* (2013.01); *F15B 2211/6336* (2013.01); *F15B 2211/6343* (2013.01); *F15B 2211/864* (2013.01); *F15B 2211/87* (2013.01); *F15B 2211/8855* (2013.01)

(56) References Cited

FOREIGN PATENT DOCUMENTS

| | | | |
|---|---|---|---|
| JP | 2007160905 | A | 6/2007 |
| JP | 2010241034 | A | 10/2010 |
| JP | 2015223592 | A | 12/2015 |
| JP | 2017072578 | A | 4/2017 |
| TW | 201431142 | A | 8/2014 |

* cited by examiner (A)

(B) POSITION SIGNAL (C) OPERATIONAL SIGNAL

MEASUREMENT TIME [s]

MONITORING DEVICE

CROSS REFERENCE TO RELATED APPLICATIONS

This application is a U.S. National Phase Application under 35 U.S.C. 371 of International Application No. PCT/JP2017/014447 filed on Apr. 7, 2017. This application is based on and claims the benefit of priority from Japanese Patent Application No. 2016-078339 filed on Apr. 8, 2016. The entire disclosures of all of the above applications are incorporated herein by reference.

TECHNICAL FIELD

The present disclosure relates to a technique for monitoring the movement of a movable object of a target device.

BACKGROUND ART

Conventionally, an auto switch is known as a means for detecting the movement of a movable object moved by an air cylinder device or the like. In the technique disclosed in PTL 1, the position of the lower pusher, which is a movable object, is detected using the auto switch. In general, the auto switch outputs an on/off signal when a movable object to which a magnetic field generating member such as a magnet is attached enters the detection range of the auto switch or exits (leaves) the detection range.

CITATION LIST

Patent Literature

[PTL 1] JP 2015-223592 A

SUMMARY

However, the auto switch cannot monitor how the movable object is moving except for when the movable object enters the detection range of the auto switch or exits the detection range. Therefore, in order to monitor the moving state of the movable object, a monitoring device comprising a detection means with a new configuration is required.

The present disclosure aims to provide a technique for monitoring the moving state of a movable object of a target device.

Solution to Problem

A monitoring device according to an aspect of the technique disclosed herein monitors the movement of a movable object (51) comprised in a target device (50). The target device includes a tubular cylinder (52) and the movable object. The movable object is moved by pressure of a fluid supplied to a chamber (56, 57) provided inside the cylinder.

The monitoring device includes a heat flux sensor (10) and a detection part (11, 12, 13). The heat flux sensor is provided to the cylinder and detects heat flux flowing between inside and outside of the cylinder due to compression or expansion of the fluid in the chamber caused in accordance with the movement of the movable object. The detection part detects the moving state of the movable object based on the output signal of the heat flux sensor.

According to the monitoring device having the above configuration, when the pressure of the fluid supplied to the chamber of the target device increases or decreases, the movable object is moved by the pressure. At this time, the temperature of the fluid rises or falls along with the compression or expansion of the fluid in the chamber. Thus, the heat flux sensor provided to the cylinder outputs a signal corresponding to the movement of the movable object. As a result, the detection part can detect the moving state of the movable object based on the output signal of the heat flux sensor. Thus, the monitoring device can monitor the moving state of the movable object of the target device.

It is to be noted that the reference numbers in parentheses of the above elements merely indicate an example of the correspondence of the above elements with the specific elements described with respect to the embodiment described below.

DESCRIPTION OF THE EMBODIMENTS

An embodiment of a monitoring device which is one aspect of the technique of the present disclosure will be explained with reference to the drawings. The same or equivalent parts in the embodiments described below are assigned with the same number.

First Embodiment

Figure 1:
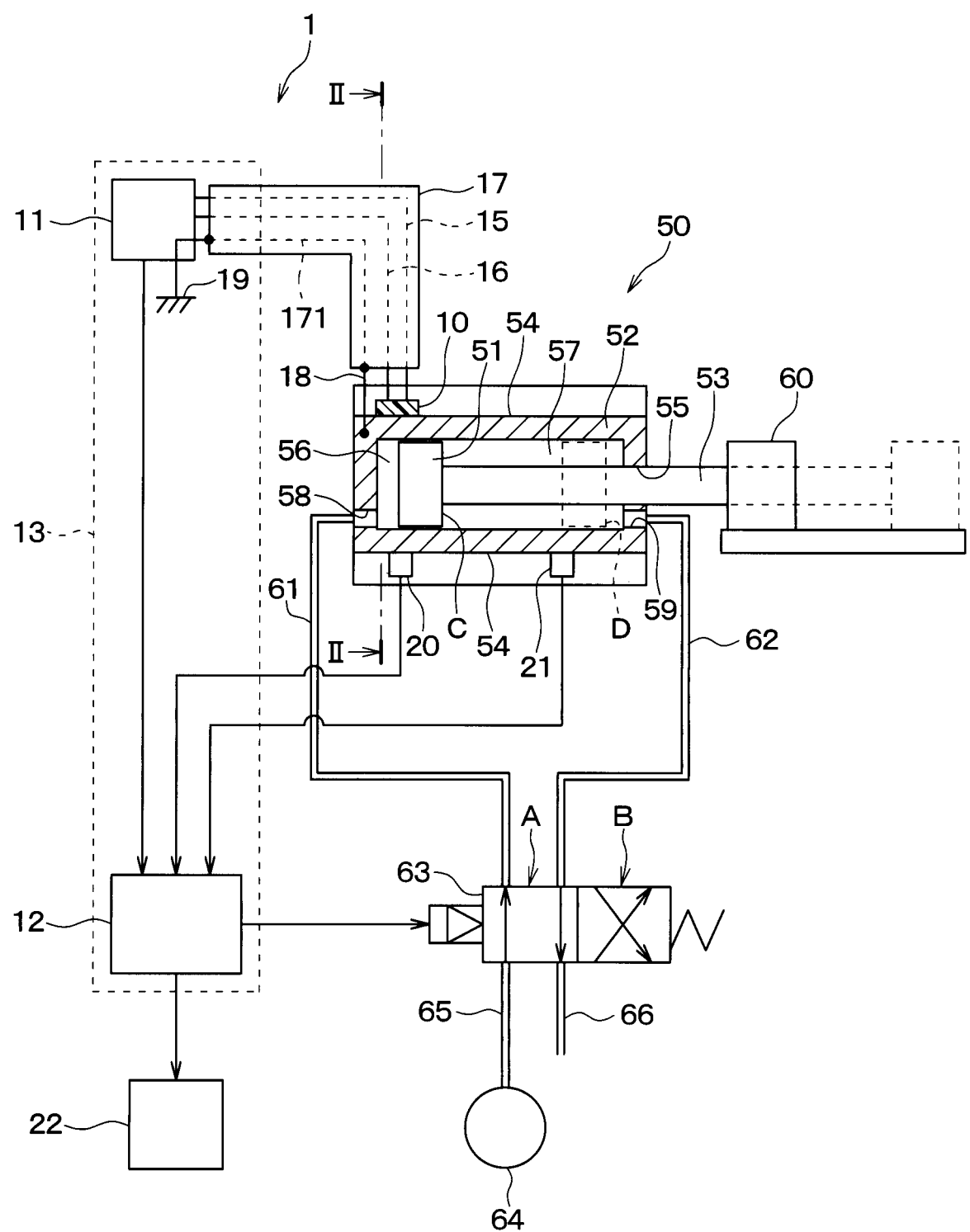
FIG. 1 is a schematic drawing showing the configuration of a target device to which a monitoring device according to a first embodiment is attached.
Figure 2:
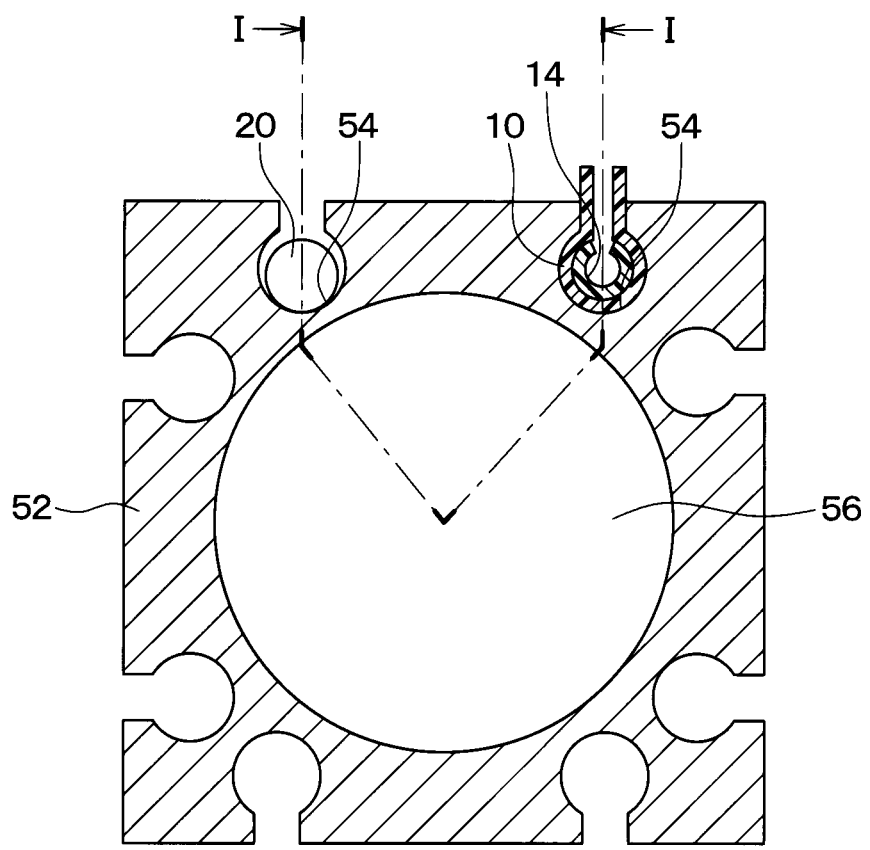
FIG. 2 is a cross-sectional view of the cylinder taken along line II-II shown in FIG. 1.

The present embodiment will be described with reference to the drawings. As shown in FIGS. 1 and 2, a monitoring device 1 of this embodiment is attached to an air cylinder 50 serving as the target device. The monitoring device 1 monitors the movement of a piston 51 (movable object) of the air cylinder 50.

First, the air cylinder 50 will be described.

The air cylinder 50 is a power cylinder device that causes the piston 51 to reciprocate using the air pressure as the power. The air cylinder 50 includes a cylinder 52, the piston 51, and a piston rod 53.

The cylinder 52 has a cylindrical shape. Inside the cylinder 52, there are two chambers 56, 57 (internal spaces). In addition, the cylinder 52 has a recessed part 54 recessed from the radially outer wall toward the chambers 56, 57. The recessed part 54 extends in the axial direction of the cylinder 52.

As illustrated in FIG. 1, the piston 51 is disposed inside the chambers 56, 57 of the cylinder 52. In the following description, the chamber 56 on the side opposite to the piston rod 53 of the piston 51 is referred to as a first chamber 56. The chamber 57 on the side of the piston rod 53 is referred to as a second chamber 57. The piston 51 can reciprocate in the axial direction of the cylinder 52 by using the pressure of the air supplied to the first chamber 56 or the second chamber 57.

The piston rod 53 is a shaft member interlocked with the piston 51. One end of the piston rod 53 is connected to the piston 51, and the other end protrudes from a hole 55 provided at an axial end of the cylinder 52. The piston rod 53 can perform various operations on a target object 60 such as carrying or holding.

A first opening 58 communicating with the first chamber 56 is formed in the cylinder 52. Further, a second opening 59 communicating with the second chamber 57 is formed in the cylinder 52.

A first pipe 61 is connected to the first opening 58 of the cylinder 52. A second pipe 62 is connected to the second opening 59. Both the first pipe 61 and the second pipe 62 are connected to a flow path switching valve 63. The flow path switching valve 63 is connected to a supply pipe 65 and an exhaust pipe 66. The supply pipe 65 is a pipe for supplying compressed air to the cylinder 52 via the flow path switching valve 63, and is connected to an air compressor 64. The exhaust pipe 66 is a pipe for discharging air from the cylinder 52 via the flow path switching valve 63, and is open to the atmosphere. The flow path switching valve 63 is driven by operational signals output from a control unit 12. According to the signals, the flow path switching valve 63 switches the communication and shutoff of the pipes described above.

To be specific, the flow path switching valve 63 switches the communication and shutoff of the pipes as follows. When the pipes are connected at the position A shown in FIG. 1, the flow path switching valve 63 establishes communication between the first pipe 61 and the supply pipe 65 and establishes communication between the second pipe 62 and the exhaust pipe 66. At this time, compressed air is supplied from the air compressor 64 to the first chamber 56. The second chamber 57 is opened to the atmosphere. As a result, the piston 51 moves from the position indicated by the solid line C to the position indicated by the broken line D.

When the pipes are connected at the position B, the flow path switching valve 63 establishes communication between the first pipe 61 and the exhaust pipe 66 and establishes communication between the second pipe 62 and the supply pipe 65. At this time, the first chamber 56 is opened to the atmosphere. Compressed air is supplied from the air compressor 64 to the second chamber 57. As a result, the piston 51 moves from the position indicated by the broken line D to the position indicated by the solid line C.

Next, the monitoring device 1 which monitors the piston 51 described above will be described.

The monitoring device 1 includes a heat flux sensor 10, a voltmeter 11, the control unit 12, and the like. The voltmeter 11 and the control unit 12 constitute a detection unit 13.

The heat flux sensor 10 is provided at the axial end of the cylinder 52 on the side of the first chamber 56. The heat flux sensor 10 detects the heat flux flowing between the inside and the outside of the cylinder 52 in accordance with the compression or expansion of the air in the first chamber 56 caused by the movement of the piston 51.

Next, the structure of the heat flux sensor 10 will be described.

Figure 3:
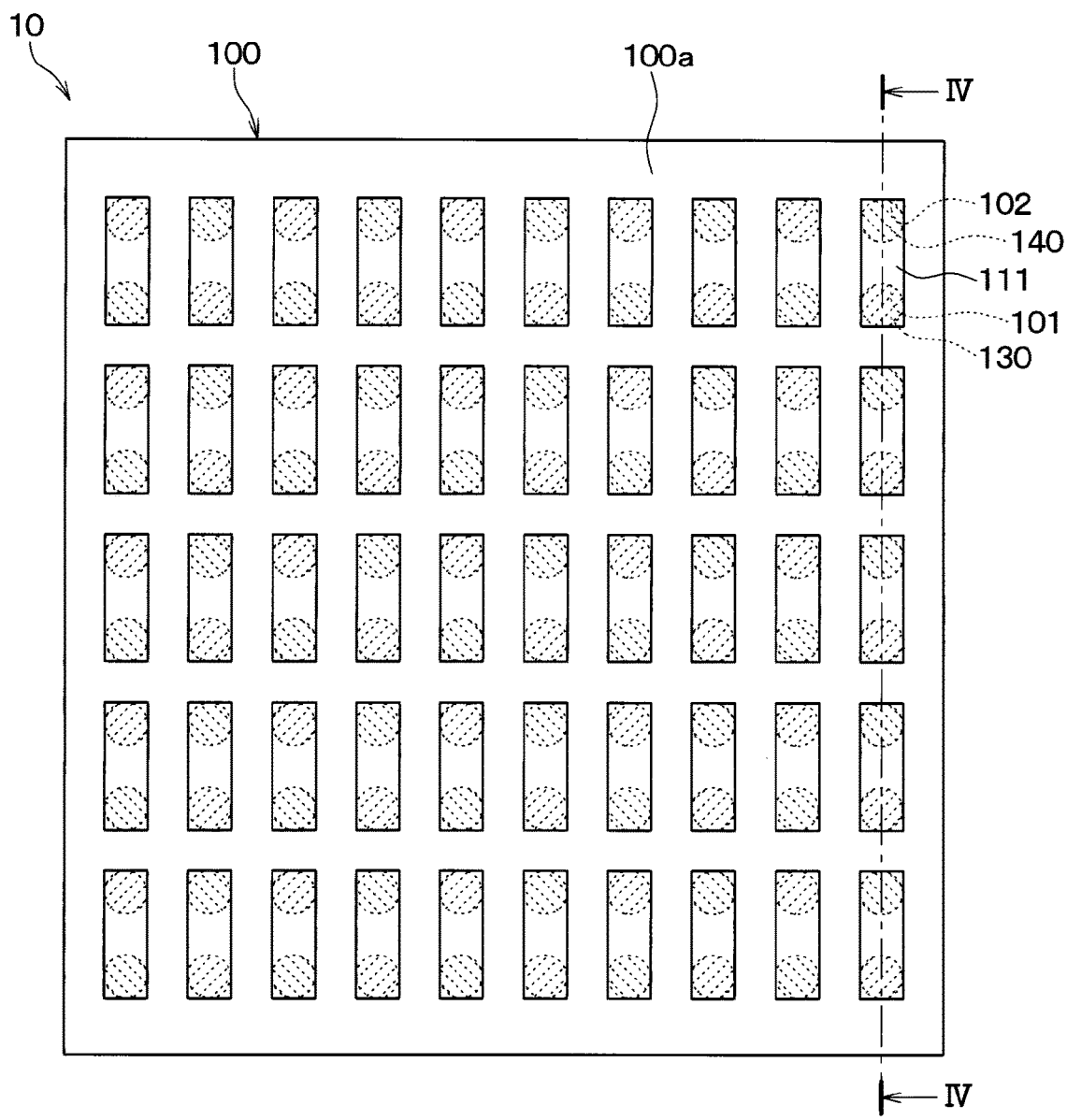
FIG. 3 is a plan view showing a state before attaching the heat flux sensor in FIG. 2 to the cylinder.
Figure 4:
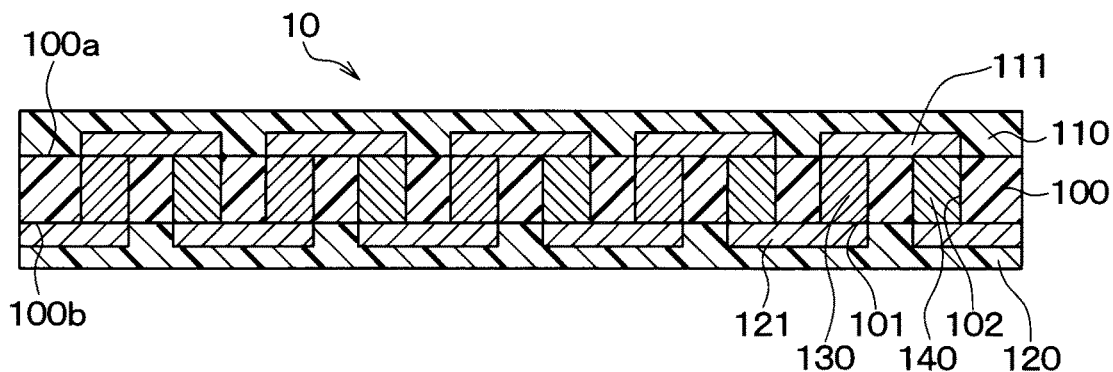
FIG. 4 is a cross-sectional view taken along line IV-IV shown in FIG. 3.

As illustrated in FIGS. 3 and 4, the heat flux sensor 10 has the following structure. The heat flux sensor 10 is an integrated element comprised of an insulating substrate 100, front side protection member (front side protection member) 110, and a rear side protection member (rear side protection member) 120. The heat flux sensor 10 also comprises first and second interlayer connecting members 130, 140 connected alternatively in series inside the integrated component. Note that the front side protection member 110 is omitted in FIG. 3. The insulating substrate 100, the front side protection member 110, and the rear side protection member 120 have a film-like form (thin form) and are formed of a flexible resin material such as thermoplastic resin. The insulating substrate 100 comprises a plurality of first and second via holes 101, 102 which penetrate through its thickness. The first and second via holes 101 and 102 are filled with the first and second interlayer connecting members 130 and 140 formed of different thermoelectric materials such as metal or semiconductors. The contacts of the first and second interlayer connecting members 130 and 140 are configured as follows. One of the contacts of each of the first and second interlayer connection members 130, 140 has a front side conductor pattern 111 arranged on the front side (front surface) 100a of the insulating substrate 100. The other of the contacts of each of the first and second interlayer connection members 130, 140 has a rear side conductor pattern 121 arranged on the rear side (rear surface) 100b of the insulating substrate 100.

When a heat flow passes through the heat flux sensor 10 in the thickness direction of the heat flux sensor 10, a temperature difference occurs between one of the contacts of each of the first and second interlayer connection members 130, 140 and the other of the contacts of each of the first and second interlayer connection members 130, 140. The temperature difference induces a thermo-electromotive force in the first and second interlayer connection members 130, 140 by the Seebeck effect. The heat flux sensor 10 outputs the generated thermo-electromotive force as a sensor signal (for example, a voltage signal).

As illustrated in FIG. 2, the heat flux sensor 10 is provided at the recessed part 54 of the cylinder 52. The inner wall of the recessed part 54 of the cylinder 52 has a curved shape. As described above, the heat flux sensor 10 is in the form of a film. The heat flux sensor 10 has the flexibility to allow it to curve along the inner wall of the recessed part 54. That is, the heat flux sensor 10 is thin and flexible. Thus, the heat flux sensor 10 has a curved shape that conform to the inner wall of the recessed part 54.

On the side opposite to the inner wall of the recess 54 with respect to the heat flux sensor 10, a pressing member 14 is provided. The pressing member 14 is formed of, for example, a urethane pipe or the like. The pressing member 14 has a tension of expanding radially outward when rolled in a cylindrical form. Thus, the pressing member 14 presses the heat flux sensor 10 against the inner wall of the recessed part 54 so that the heat flux sensor 10 and the inner wall of the recessed part 54 are brought into tight contact. As a result, the heat flow flows well through the inner wall of the recessed part 54, the heat flux sensor 10, and the pressing member 14. Thus, the heat flux sensor 10 outputs a signal corresponding to the heat flux flowing between the face on the side of the inner wall of the recessed part 54 of the cylinder 52 and the face on the side of the pressing member 14.

As illustrated in FIG. 1, the voltage signal output from the heat flux sensor 10 is measured by the voltmeter 11. The wires 15 and 16 connecting the heat flux sensor 10 and the voltmeter 11 pass inside a tubular shielded line 17. The shielded line 17 has a conductor 171 for preventing electromagnetic waves entering from the outside. For the sake of explanation, in FIG. 1, the conductor 171 is indicated by a broken straight line. The actual conductor 171 is formed in a cylindrical shape so as to surround the wires 15, 16 inside the shielded line 17.

The conductor 171 of the shielded line 17 is electrically connected to the cylinder 52 via a wire 18 or the like. The conductor 171 of the shielded line 17 may be directly connected to the cylinder 52. The conductor 171 of the shielded line 17 is preferably connected to the ground 19. This makes it possible to reduce noise from the voltage signal output from the heat flux sensor 10.

Note that the cylinder 52 and the ground 19 may be directly connected via a ground wire (not shown).

The measured value of the voltmeter 11 is transmitted to the control unit 12. The control unit 12 includes a microcomputer, etc. and is configured as a computing device. The control unit 12 detects the moving state of the piston 51 based on the output signal of the heat flux sensor 10 measured by the voltmeter 11. The method of detecting the moving state of the piston 51 will be described later.

As illustrated in FIGS. 1 and 2, recesses 54 of the cylinder 52 are provided with two auto switches 20, 21. The auto switches 20, 21 operate as follows. For example, a magnetic field generated by a magnetic field generating member such as a magnet provided to the piston 51 enters the detection range of the auto switch 20, 21. Then, the auto switch 20, 21 turns on the contact of the switch provided therein. On the other hand, the magnetic field exits (leaves) the detection range of the auto switch 20, 21. Then, the auto switch 20, 21 turns off the contact of the switch provided therein.

In the following description, the auto switch 20 provided at the axial end of the cylinder 52 on the side of the first chamber 56 is referred to as a first auto switch 20. The auto switch 21 provided at the end on the side of the second chamber 57 is referred to as a second auto switch 21.

The first auto switch 20 turns on the switch when the piston 51 is positioned at the end of the cylinder 52 on the side of the first chamber 56 (when it enters the detection range). The first auto switch 20 turns off the switch when the piston 51 leaves the end of the cylinder 52 on the side of the first chamber 56 (when it exits from the detection range). The second auto switch 21 turns on the switch when the piston 51 is positioned at the end of the cylinder 52 on the side of the second chamber 57 (when it enters the detection range). The second auto switch 21 turns off the switch when the piston 51 leaves the end of the cylinder 52 on the side of the second chamber 57 (when it exits from the detection range).

The signals of the first and second auto switches 20, 21 are transmitted to the control unit 12.

Next, the method of detecting the moving state of the piston 51 by the control unit 12 will be described.

As described above, the control unit 12 outputs an operational signal for driving the flow path switching valve 63. Further, the control unit 12 receives the output signals of the heat flux sensor 10 measured by the voltmeter 11 and the on/off signals of the first and second auto switches 20, 21.

Figure 5:
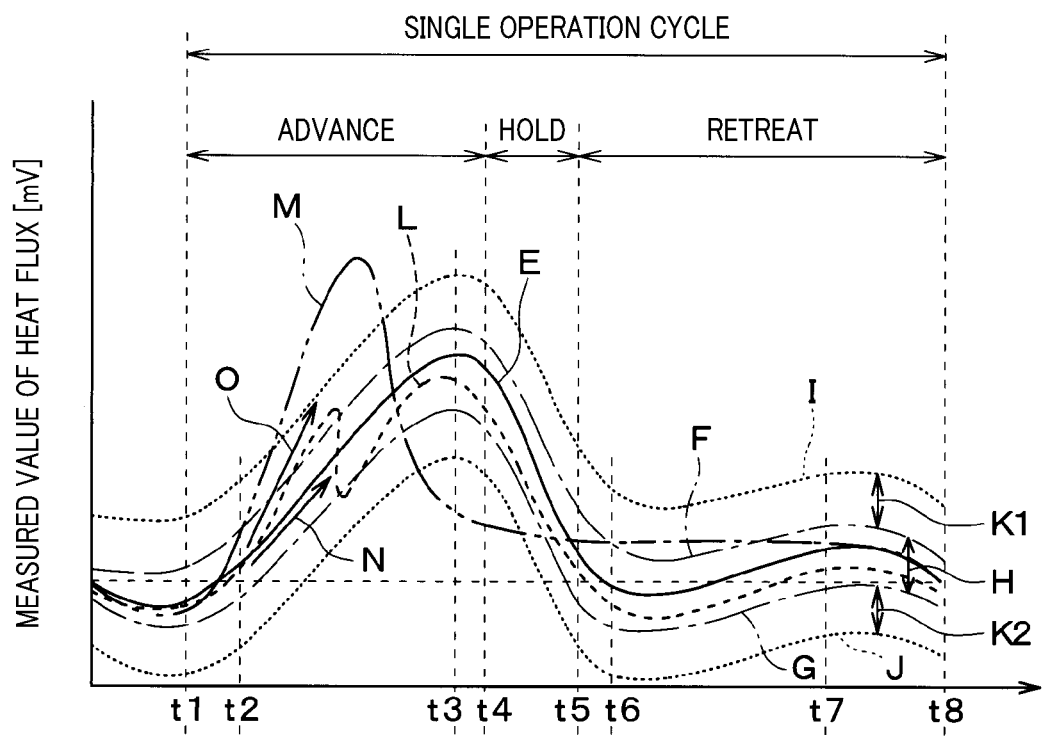
FIG. 5 is a graph showing examples of the waveforms of the output signals of the heat flux sensor, the auto switch, and the control unit provided in the monitoring device.
Figure 5:
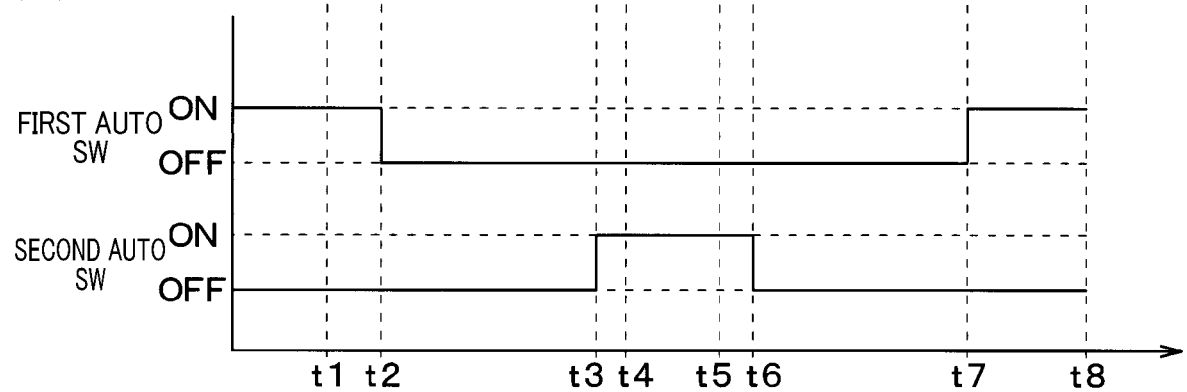
Figure 5:
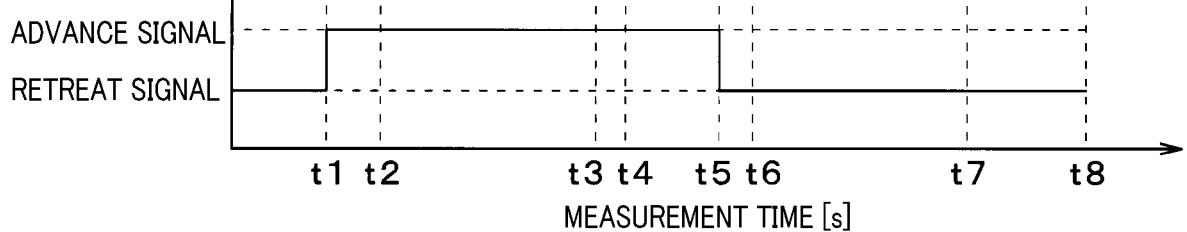

FIG. 5(A) illustrates an example of the waveform (behavior) of the output signal of the heat flux sensor 10 when the piston 51 performs single cycle operation. Here, single cycle operation means the following movement of the piston 51 as follows. Specifically, it indicates a operation in which the piston 51 moves (advances) from the position shown by the solid line C in FIG. 1 to the position shown by the broken line D, holds the position of the piston rod 53 for a certain time, and then moves (retreats) again from the position indicated by the broken line D to the position indicated by the solid line C.

The waveform indicated by the solid line E in FIG. 5(A) schematically shows the average waveform during normal (proper) movement detected by performing a plurality of tests. Note that the average waveform during normal movement varies depending on the shape or size of the air cylinder 50, change in the air pressure of the compressed air supplied from the air compressor 64, the shape or size of the target object 60, and so on.

FIG. 5(B) illustrates an example of the waveform of the on/off signals of the first and second auto switches 20, 21 when the piston 51 performs single cycle operation.

FIG. 5(C) illustrates an example of the waveform of the operational signal transmitted to the flow path switching valve 63 from the control unit 12 when the piston 51 performs single cycle operation.

<Advance Operation>

As shown in FIG. 5(C), at time t1, an advance signal is transmitted from the control unit 12 to the flow path switching valve 63 as an operational signal for advancing the piston 51. As a result, the flow path switching valve 63 is set to the position A shown in FIG. 1. Thus, the compressed air passes through the supply pipe 65 and the first pipe 61 from the air compressor 64 and is supplied to the first chamber 56. Further, the second chamber 57 communicates with the second pipe 62 and the exhaust pipe 66, and is opened to the atmosphere. Accordingly, the air in the first chamber 56 is pressurized whereas the air in the second chamber 57 is opened to the atmosphere. As a result, the piston 51 moves from the position indicated by the solid line C towards the position indicated by the broken line D.

At time t2, the magnetic field generated by the magnetic field generating member provided to the piston 51 exits from the detection range of the first auto switch 20 (the piston 51 leaves the end on the side of the first chamber 56). As a result, as shown in FIG. 5(B), at time t2, the first auto switch 20 turns off. Subsequently, at time t3, the magnetic field generated by the magnetic field generating member provided to the piston 51 enters the detection range of the second auto switch 21 (the piston 51 is positioned at the end on the side of the second chamber 57). As a result, as shown in FIG. 5(B), at time t3, the second auto switch 21 turns on. After that, at time t4, the advance operation of the piston 51 ends, and the position of the piston rod 53 is held.

As indicated by the solid line E in FIG. 5(A), the average waveform during normal movement increases from the start of advancing at time t1 to the end of advancing at time t3. This is because heat is generated as a result of the air in the first chamber 56 being compressed and a heat flow flows from the first chamber 56 of the cylinder 52 to the outside.

<Holding Operation>

After the position of the piston rod 53 is held at time t4, the holding operation is continued as follows. Specifically, it continues until time t5 at which a retreat signal is transmitted from the control unit 12 to the flow path switching valve 63 as an operational signal for retreating the piston 51. As indicated by the solid line E in FIG. 5(A), the average waveform during normal movement decreases from time t3 to time t6. This is because the stopping of the piston 51 stops the movement of air in the first chamber 56 of the cylinder 52 and the heat flow flowing from the first chamber 56 of the cylinder 52 to the outside decreases.

<Retreat Operation>

As shown in FIG. 5(C), at time t5, a retreat signal for the piston 51 is transmitted from the control unit 12 to the flow path switching valve 63. As a result, the flow path switching valve 63 is set to the position B shown in FIG. 1. Thus, the compressed air passes through the supply pipe 65 and the second pipe 62 from the air compressor 64 and is supplied to the second chamber 57. Further, the first chamber 56 communicates with the first pipe 61 and the exhaust pipe 66, and is opened to the atmosphere. Accordingly, the air in the second chamber 57 is pressurized whereas the air in the first chamber 56 is opened to the atmosphere. As a result, the piston 51 moves from the position indicated by the broken line D towards the position indicated by the solid line C.

At time t6, the magnetic field generated by the magnetic field generating member provided to the piston 51 exits from the detection range of the second auto switch 21 (the piston 51 leaves the end on the side of the second chamber 57). As a result, as shown in FIG. 5(B), at time t6, the second auto switch 21 turns off. Subsequently, at time t7, the magnetic field generated by the magnetic field generating member provided to the piston 51 enters the detection range of the first auto switch 20 (the piston 51 is positioned at the end on the side of the first chamber 56). As a result, as shown in FIG. 5(B), at time t7, the first auto switch 20 turns on. After that, at time t8, the retreat operation of the piston 51 ends.

As indicated by the solid line E in FIG. 5(A), the average waveform during normal movement changes gradually from the start of retreating at time t5 to the end of retreating at time t8. This is because the air in the first chamber 56 is opened to the atmosphere and therefore the heat flow between the first chamber 56 of the cylinder 52 and the outside is small.

As described above, the monitoring device 1 of the present embodiment can measure the output signal of the heat flux sensor 10 while the piston 51 is moving. The monitoring device 1 can show the relationship between the waveform (behavior) of the measured output signal and the operational signal in a graph, or digitize it. That is, the monitoring device 1 of the present embodiment can visualize and monitor the behavior of the piston 51 based on the waveform of the output signal.

<Finding Normal Movement Region>

When the piston 51 moves normally, the output signal of the heat flux sensor 10 shows a behavior within a certain range. Focusing on this point, an experiment is carried out for a plurality of times to obtain statistical data on the output signal of the heat flux sensor 10 of when the piston 51 is moving normally. This makes it possible to preset, in the detection part 13 including the control unit 12, the behavior range of the output signal of the heat flux sensor 10 of when the piston 51 is moving normally.

In FIG. 5(A), the upper limit of the output signal of the heat flux sensor 10 when the piston 51 is moving normally is indicated by an alternate long and short dash line F, and the lower limit is indicated by an alternate long and short dash line G. As illustrated in FIG. 5(A), the behavior range of the output signal of the heat flux sensor 10 during normal movement is the region between the alternate long and short dash line F and the alternate long and short dash line G. In the following description, this region is referred to as a determined-as-normal region H (normal determining region). The determined-as-normal region H is stored in advance in a predetermined storage area of a storage device (a non-transitory tangible computer readable medium such as a memory of the control unit 12) of the detection unit 13.

<Finding Abnormal Movement Region>

For example, assuming that foreign matter slips in between the inner wall of the cylinder 52 and the piston 51 when the piston 51 advances, the movement of the piston 51 becomes slower (the movement deteriorates) as compared with when it is moving normally. As a result, the air in the first chamber 56 is compressed more than in normal movement. Thus, the rate of increase of the output signal of the heat flux sensor 10 increases. On the contrary, when the inner wall of the cylinder 52 or the outer wall of the piston 51 wears and the gap becomes large, the movement of the piston 51 becomes faster than when the movement is normal. As a result, the air in the first chamber 56 expands more than in normal movement. Therefore, the output signal of the heat flux sensor 10 drops more than in normal movement or the rate of increase becomes smaller than in normal movement. Focusing on these points, an experiment is carried out for a plurality of times to obtain statistical data on the output signal of the heat flux sensor 10 when the piston 51 is moving abnormally or showing a sign of abnormality. This makes it possible to preset, in the detection part 13 including the control unit 12, the behavior range of the output signal of the heat flux sensor 10 of when the piston 51 is moving abnormally or showing a sign of abnormality.

In FIG. 5(A), the upper limit of the output signal of the heat flux sensor 10 of when the piston 51 is showing a sign of abnormally is indicated by a broken line I, and the lower limit is indicated by a broken line J. As illustrated in FIG. 5(A), the behavior range of the output signal of the heat flux sensor 10 when there is a sign of abnormality is the region between the broken line I and the broken line J excluding the determined-as-normal region H. In the following description, this region is referred to as a determined-as-sign-of-abnormality region K1, K2 (abnormality determining region). The determined-as-sign-of-abnormality region K1, K2 is stored in advance in a predetermined storage area of a storage device (a non-transitory tangible computer readable medium such as a memory of the control unit 12) of the detection unit 13.

<Detection of Normal Waveform/Abnormality Sign Waveform/Abnormal Waveform>

The monitoring device 1 of the present embodiment detects whether or not the output signal of the heat flux sensor 10 of when the piston 51 is moving is within the range of the determined-as-normal region H (within the normal behavior range). Alternatively, the monitoring device 1 of the present embodiment detects whether or not the output signal of the heat flux sensor 10 when the piston 51 is moving is within the range of the determined-as-sign-of-abnormality region K1, K2 (within the sign of abnormality behavior range).

For example, as shown by the solid line E in FIG. 5(A), when the output signal of the heat flux sensor 10 is within the range of the determined-as-normal region H, a determination circuit of the detection part 13 including the control unit 12 determines that the piston 51 is moving normally.

As indicated by the broken line L in FIG. 5(A), when the output signal of the heat flux sensor 10 is outside the range of the determined-as-normal region H and within the range of the determined-as-sign-of-abnormality region K1, K2, the determination circuit of the detection part 13 determines that the movement of the piston 51 is likely to be abnormal.

As indicated by the two-dot chain line M in FIG. 5(A), when the output signal of the heat flux sensor 10 is outside the range of the determined-as-normal region H and outside the range of the determined-as-sign-of-abnormality region K1, K2, the determination circuit of the detection part 13 determines that the movement of the piston 51 is abnormal.

The detection part 13 may also detect whether or not the output signal of the heat flux sensor 10 of when the piston 51 is moving is within the range of the determined-as-normal region H (normal determining region) in a method different from that described above. Alternatively, the detection part 13 may detect whether or not the output signal of the heat flux sensor 10 of when the piston 51 is moving is within the range of the determined-as-sign-of-abnormality region K1, K2 (abnormality determining region).

That is, in the present embodiment, the determination circuit of the detection part 13 performs the following waveform determination. The determination circuit determines whether or not the waveform of the output signal of the heat flux sensor 10 is distorted more than an allowable distorted waveform which is preset based on the waveform of the output signal of the heat flux sensor 10 of when the piston 51 is moving normally. Here, the allowable distorted waveform indicates a waveform as follows. Specifically, it indicates a waveform of the detected signal having a slope that is within a certain range of angle from the slope of the waveform of the output signal of the heat flux sensor 10 in normal movement. Alternatively, it indicates a waveform that does not continuously stay longer than a certain time period in a state where the slope of the waveform of the detected signal is equal to or greater than a certain angle.

For example, the arrow N in FIG. 5(A) indicates an example of the slope of the waveform represented by the solid line E over a certain period of time. The arrow O indicates an example of the slope of the waveform represented by the broken line L over a certain period of time. Here, it is assumed that the slope of the arrow O is greater than the slope of the arrow N by a certain angle or more, and that this state continues for a predetermined time. As a result, the detection part 13 determines that the waveform indicated by the broken line L is distorted more than the preset allowable distorted waveform. In such case, the detection part 13 determines that the movement of the piston 51 is suggestive of abnormality based on the waveform indicated by the broken line L.

Based on the determination result of the detection part 13, a warning part 22 (see FIG. 1) issues a warning signal. The warning part 22 is, for example, a monitor, a buzzer, a lamp, or the like. The warning part 22 issues a warning signal through, for example, an image, sound, light, or the like. Thus, the warning part 22 can notify the user of the monitoring device 1 of the result of acceptance/rejection determination performed on a product, a maintenance warning for the target device, emergency stop of the air cylinder 50, etc. Further, the warning part 22 may issue a warning signal and also stop the movement of the air cylinder 50.

The detection part 13 including the control unit 12 thus detects the moving state of the piston 51.

As described above, the monitoring device 1 of this embodiment provides functions and effects as follow.

(1) In the present embodiment, the heat flux sensor 10 provided to the cylinder 52 outputs a signal corresponding to the movement of the piston 51. As a result, the detection part 13 can detect the moving state of the piston 51 based on the output signal of the heat flux sensor 10. Thus, the monitoring device 1 can monitor the moving state of the piston 51 of the air cylinder 50.

(2) In this embodiment, the detection part 13 determines whether or not the output signal of the heat flux sensor 10 is within a certain behavior range (within the behavior range of the output signal of the heat flux sensor 10 of when the piston 51 is moving normally).

When the piston 51 moves normally, the output signal of the heat flux sensor 10 shows a behavior within a certain range. This makes it possible to preset, in the detection part 13, the behavior range of the output signal of the heat flux sensor 10 when the piston 51 is moving normally based on experimental results or the like. Thus, the detection part 13 can detect whether or not the movement of the piston 51 is normal based on the output signal of the heat flux sensor 10.

(3) In this embodiment, the detection part 13 stores, in a predetermined storage area, the determined-as-normal region H which is the behavior range of the output signal of the heat flux sensor 10 of when the piston 51 is moving normally. Further, the detection part 13 stores, in a predetermined storage area, the determined-as-sign-of-abnormality region K1, K2 which is the behavior range of the output signal of the heat flux sensor 10 of when there is a sign of abnormality. The detection part 13 detects that the movement of the piston 51 is normal when the output signal of the heat flux sensor 10 is within the range of the determined-as-normal region H. In addition, when the output signal of the heat flux sensor 10 is outside the range of the determined-as-normal region H and within the range of the determined-as-sign-of-abnormality region K1, K2, the detection part 13 determines that the movement of the piston 51 is likely to be abnormal. When the output signal of the heat flux sensor 10 is outside the range of the determined-as-normal region H and outside the range of the determined-as-sign-of-abnormality region K1, K2, the detection part 13 determines that the movement of the piston 51 is abnormal.

The detection part 13 can judge the movement of the piston 51 based on the output signal of the heat flux sensor 10 as follows. Specifically, the detection part 13 can determine whether or not the movement of the piston 51 is normal. Further, the detection part 13 can determine whether or not the movement of the piston 51 is suggestive of abnormality. Furthermore, the detection part 13 can determine whether or not the movement of the piston 51 is abnormal.

(4) In this embodiment, the detection part 13 determines whether or not the waveform of the output signal of the heat flux sensor 10 is distorted more than a predetermined allowable distorted waveform (an allowable distorted waveform which is preset based on the waveform of the output signal of the heat flux sensor 10 of when the piston 51 is moving normally).

When the piston 51 is moving normally, it performs a constant movement according to the pressure of the air supplied to the first chamber 56 of the cylinder 52. Thus, it is possible to preset, in the detection part 13, an allowable distorted waveform based on the output signal of the heat flux sensor 10 of when the piston 51 is moving normally from experimental results obtained by carrying out an experiment multiple times. Thus, the detection part 13 can detect whether or not the movement of the piston 51 is normal based on the waveform of the output signal of the heat flux sensor 10.

(5) This embodiment further comprises the warning part 22 that issues a warning signal based on the determination result of the detection part 13.

The warning part 22 can notify the user of the monitoring device 1 of the result of acceptance/rejection determination performed on a product, a maintenance warning for the air cylinder 50, emergency stop of the air cylinder 50, etc.

(6) In this embodiment, the heat flux sensor 10 is provided in the recessed part 54 recessed from the outer wall of the cylinder 52 toward the first chamber 56.

The heat flux sensor 10 is provided at a position close to the first chamber 56 which is the heat source. Accordingly, the monitoring device 1 can improve the accuracy of detecting heat flux by the heat flux sensor 10.

(7) In this embodiment, the heat flux sensor 10 has the flexibility to allow it to curve along the inner wall of the recessed part 54 having a curved face.

The heat flux sensor 10 and the inner wall of the recessed part 54 are brought into close contact with each other with no air between them. Accordingly, the monitoring device 1 can improve the detection accuracy of the heat flux sensor 10.

(8) In this embodiment, the monitoring device 1 includes the pressing member 14 that presses the heat flux sensor 10 against the inner wall of the recessed part 54.

No gap is formed between the heat flux sensor 10 and the inner wall of the recessed part 54 (generation of a gap can be prevented).

Second Embodiment

The present embodiment will be described with reference to the drawings. This embodiment is different from the first embodiment in the manner the heat flux sensor 10 is attached. The other aspects are the same as the first embodiment. Therefore, only the parts that are different from the first embodiment will be described below.

Figure 6:
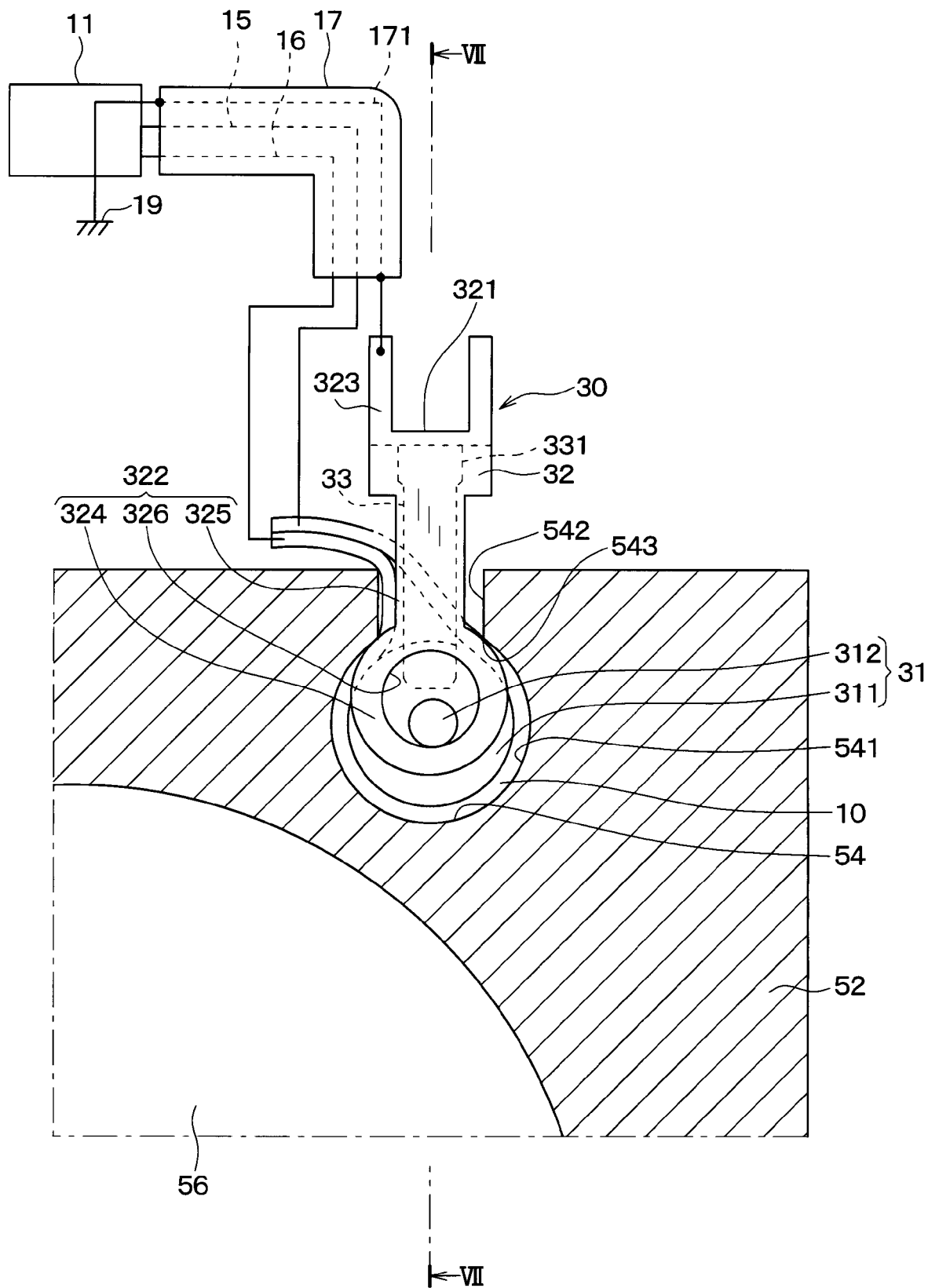
FIG. 6 is a partial cross-sectional view of the cylinder to which the monitoring device is attached according to the second embodiment.
Figure 7:
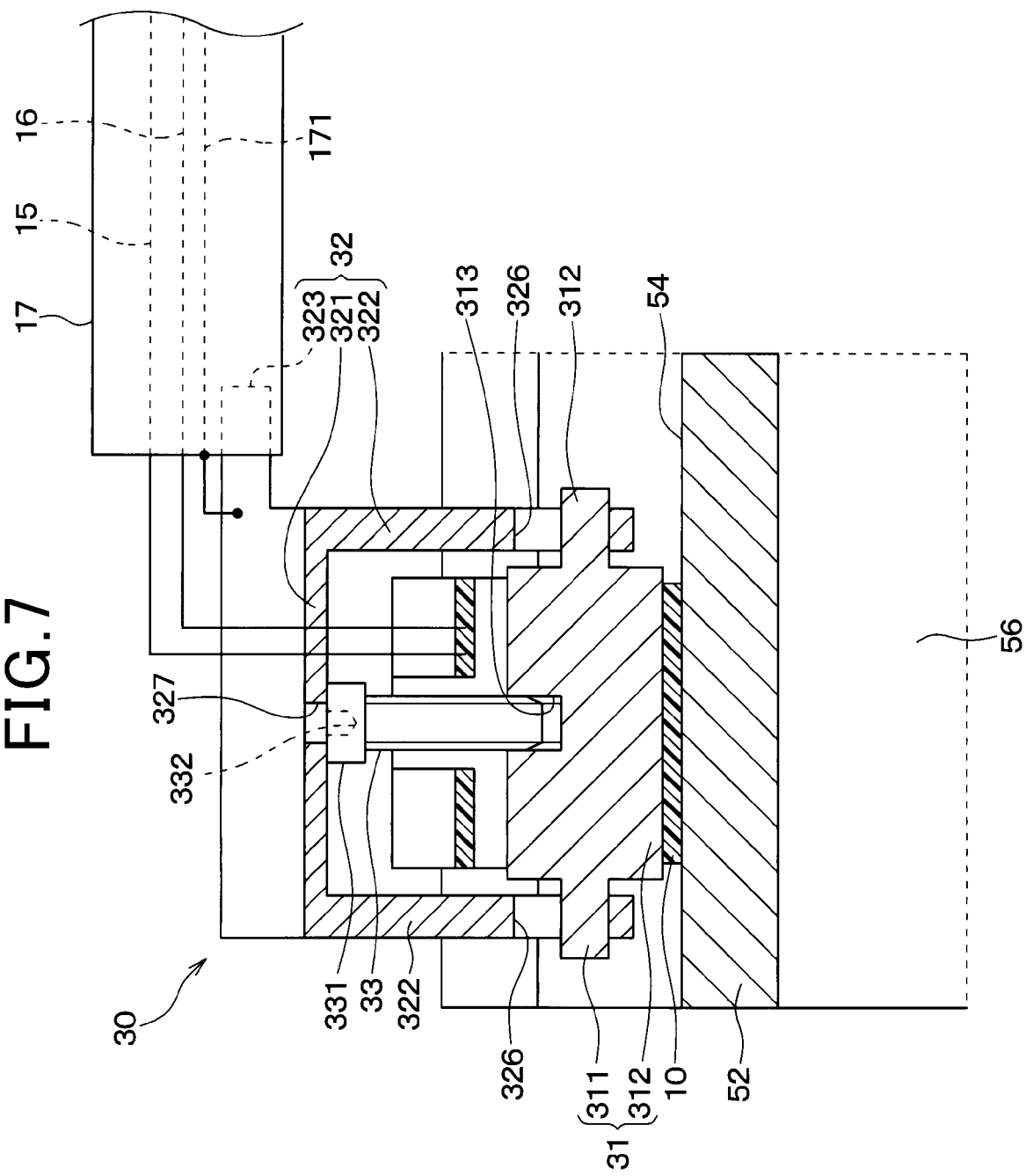
FIG. 7 is a cross-sectional view taken along line VII-VII shown in FIG. 6.

As illustrated in FIGS. 6 and 7, the heat flux sensor 10 of this embodiment is provided to the recessed part 54 of the cylinder 52 by a pressing member 30. The recessed part 54 has an opening in the axial end of the cylinder 52. Therefore, the heat flux sensor 10 and the pressing member 30 are respectively inserted into the recessed part 54 from the opening in the axial end of the cylinder 52, and are placed. The recessed part 54 of the cylinder 52 has a cylindrical groove 541 and an opening groove 542. The cylindrical groove 541 is formed on the side of the first chamber 56. The opening groove 542 extends from the cylindrical groove 541 toward the outer wall of the cylinder 52. The width of the opening groove 542 is smaller than the inner diameter of the cylindrical groove 541. Thus, the cylinder 52 has a shoulder part 543 at the part where the cylindrical groove 541 and the opening groove 542 meet.

The pressing member 30 comprises a (solid) cylindrical member 31, a support member 32, a screw member 33, etc. The cylindrical member 31 is formed of a conductor such as metal.

The cylindrical member 31 has a cylindrical part 311 and a shaft part 312. The shaft part 312 is provided at both axial ends of the cylindrical part 311. The heat flux sensor 10 is in the form of a film. The heat flux sensor 10 is wound around the outer surface of the cylindrical part 311.

The support member 32 comprises a support body part 321, two arm parts 322, a shielded-line attachment part 323, etc. The support body part 321 is provided at a position distant from the above-described cylindrical member 31 and extends along the axial direction of the cylindrical member 31. The two arm parts 322 extend from both end parts of the support member 32 toward the cylindrical member 31. The arm parts 322 each have an annular part 324 and a connecting part 325. The width of the annular part 324 is larger than the width of the opening groove 542. The connecting part 325 extends in a radial direction from a part of the outer periphery of the annular part 324. The width of the connecting part 325 is smaller than the width of the opening groove 542. The annular part 324 is provided with a circular hole 326. The inner diameter of the circular hole 326 is larger than the outer diameter of the shaft part 312 of the cylindrical member 31. The shaft part 312 of the cylindrical member 31 is inserted through the circular hole 326.

A tubular shielded line 17 is attached to the shielded-line attaching part 323. The conductor 171 of the shielded line 17 is electrically connected to the shielded-line attaching part 323. The conductor 171 of the shielded line 17 is connected to the ground 19. For the sake of explanation, in FIGS. 6 and 7, the conductor 171 is indicated by a broken straight line. The actual conductor 171 is formed in a cylindrical shape so as to surround the wires 15, 16 inside the shielded line 17.

The screw member 33 comprises a head part 331 in contact with the support body part 321 and is screwed into a screw hole 313. The end of the screw hole 313 on the side opposite to the head part 331 is provided in the cylindrical part 311. The screw member 33 is configured such that a fastening jig such as a square socket wrench is inserted into a square hole 332 on the head part 331 via a hole 327 provided in the support main part 321. The screw member 33 can thereby rotate around its axis. When the screw member 33 rotates in one of the two directions around its axis, the distance between the cylindrical member 31 and the support body part 321 increases. As a result, the cylindrical member 31 and the heat flux sensor 10 wound around the cylindrical member 31 are pressed against the inner wall of the cylindrical groove 541. The annular part 324 of the arm part 322 contacts with the shoulder part 543 of the cylinder 52. Thus, the heat flux sensor 10 and the inner wall of the recessed part 54 are brought into close contact. As a result, the heat flow flows well through the inner wall of the recessed part 54, the heat flux sensor 10, and the pressing member 30. Accordingly, the heat flux sensor 10 outputs a signal corresponding to the heat flow (heat flux) passing through in the thickness direction.

As described above, in this embodiment, the axial force of the screw member 33 forces the cylindrical member 31 and the heat flux sensor 10 to be pressed against the inner wall of the cylindrical groove 541. The reaction force causes the annular part 324 of the arm part 322 to contact the shoulder part 543 of the cylinder 52. Thus, the pressing member 30 and the cylinder 52 are electrically connected. Therefore, the cylinder 52 is electrically connected to the ground 19 via the pressing member 30. Thus, in the present embodiment, it is possible to reduce the influence of noise generated from the cylinder 52 on the output signal of the heat flux sensor 10.

Third Embodiment

The present embodiment will be described with reference to the drawings. This embodiment is also different from the first embodiment in the manner the heat flux sensor 10 is attached. The other aspects are the same as the first embodiment. Therefore, only the parts that are different from the first embodiment will be described below.

Figure 8:
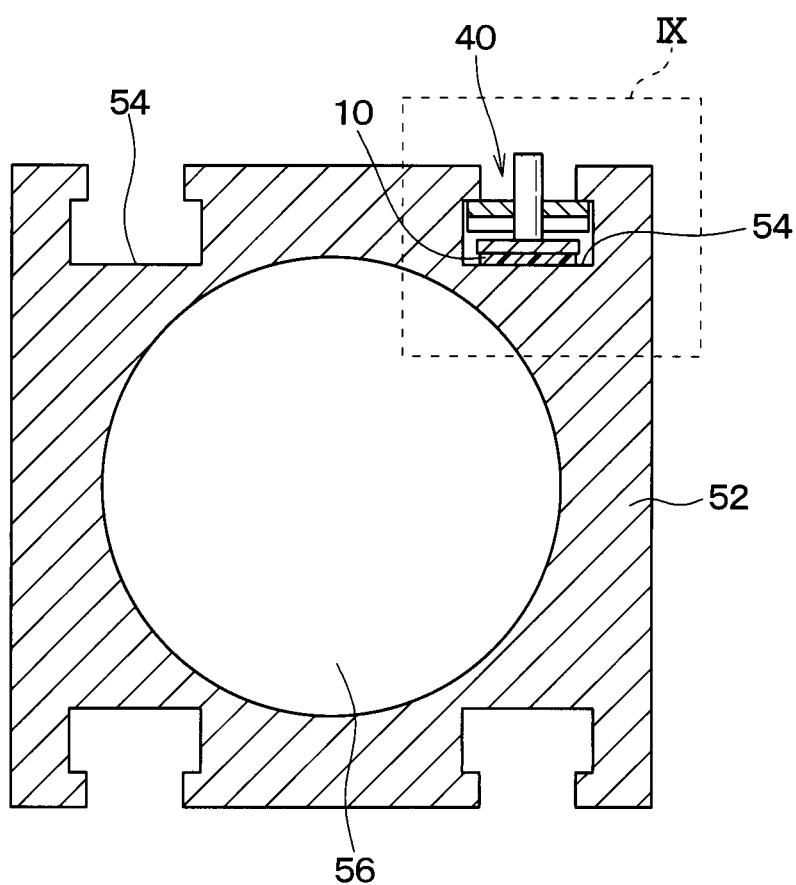
FIG. 8 is a cross-sectional view of the cylinder to which the monitoring device is attached according to the third embodiment.
Figure 9:
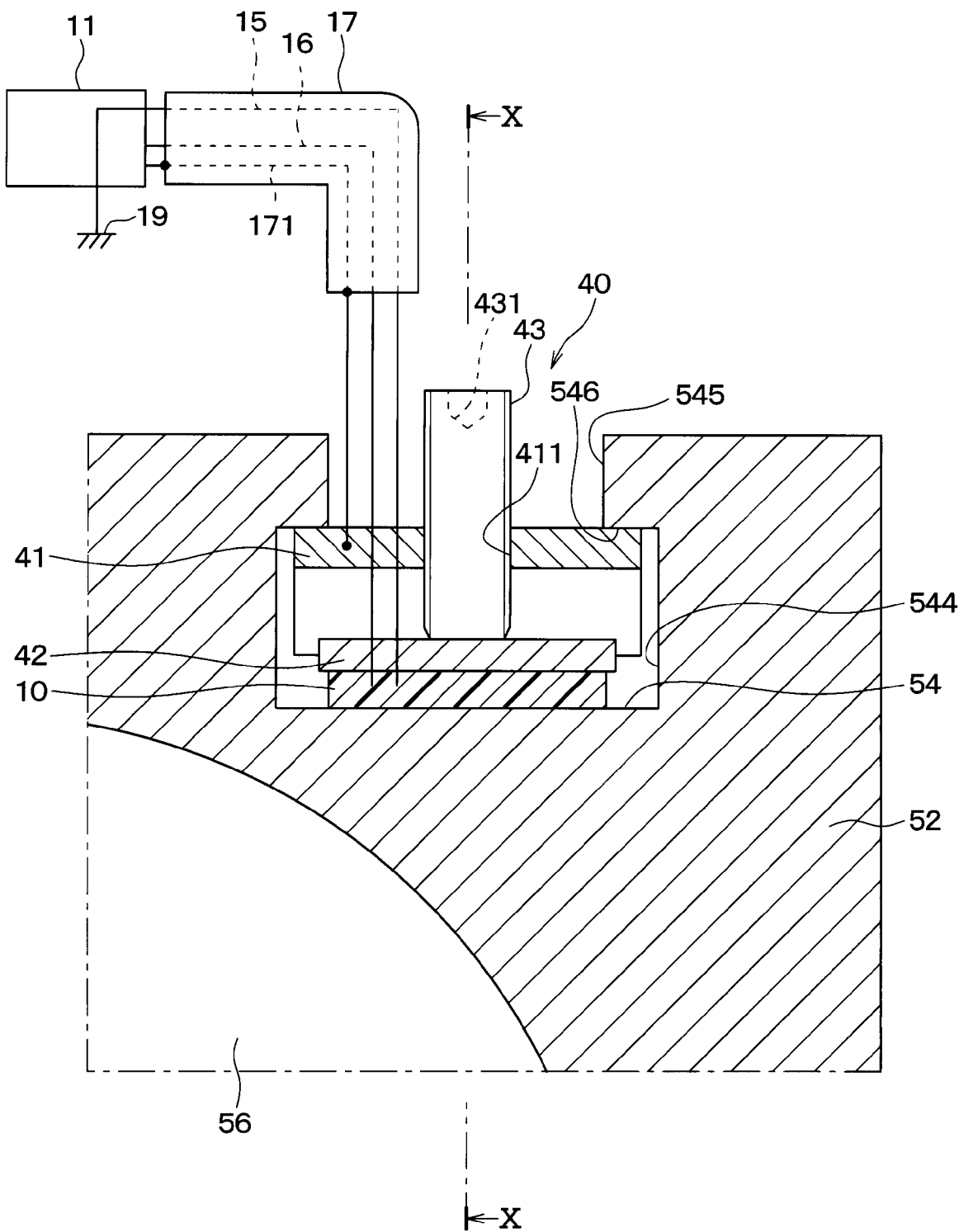
FIG. 9 is an enlarged view of the part IX of FIG. 8.
Figure 10:
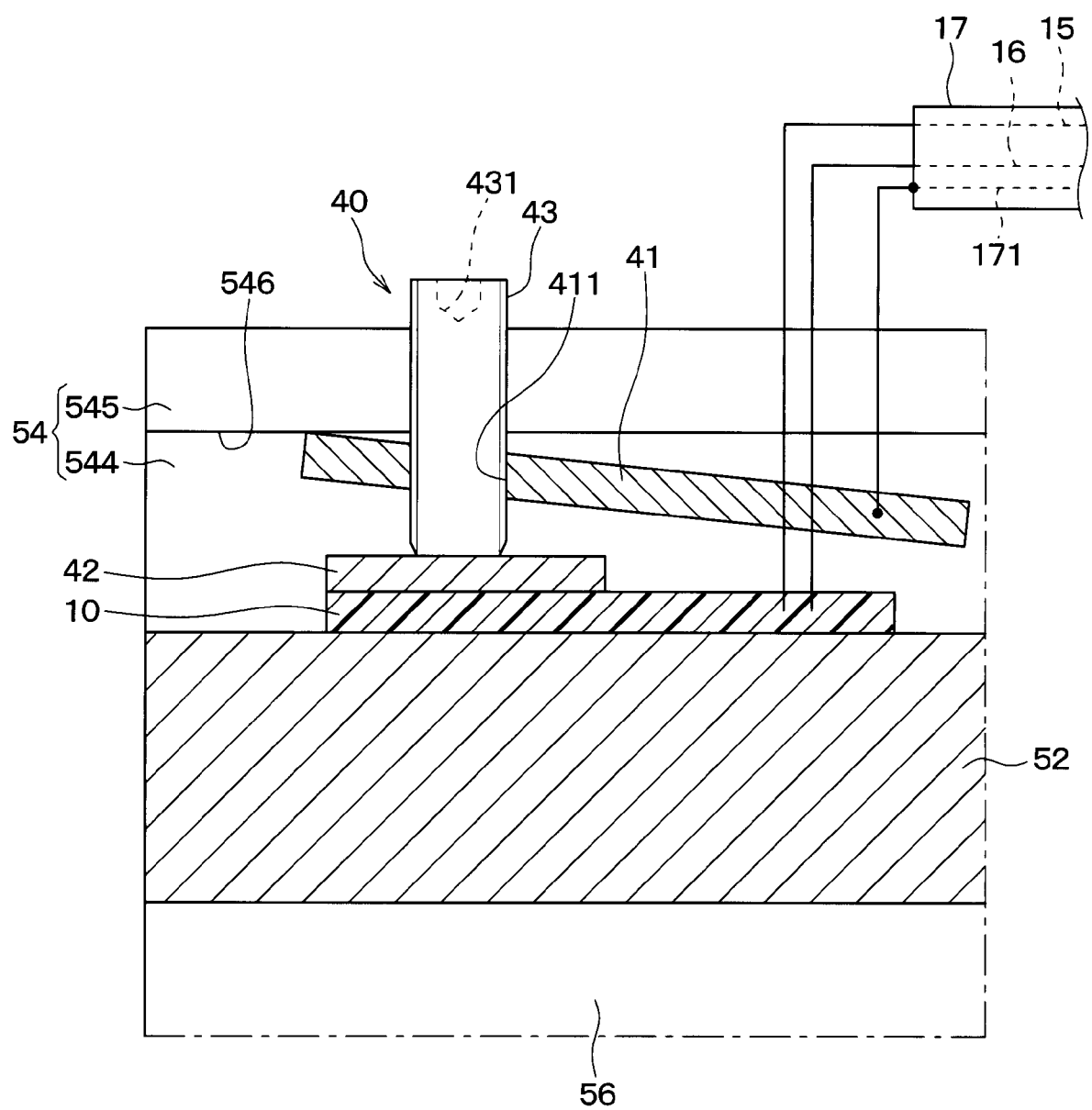
FIG. 10 is a cross-sectional view taken along line X-X shown in FIG. 9.

As illustrated in FIGS. 8 to 10, the recessed part 54 of the cylinder 52 has a rectangular groove 544 and an opening groove 545. The rectangular groove 544 is formed on the side of the chambers 56, 57 of the cylinder 52 (on the side of the first chamber 56 and on the side of the second chamber 57). The opening groove 545 extends from the rectangular groove 544 toward the outer wall of the cylinder 52. The rectangular groove 544 has a substantially rectangular cross section. The width of the opening groove 545 is smaller than the width of the rectangular groove 544. Thus, the cylinder 52 has a shoulder part 546 at the part where the rectangular groove 544 and the opening groove 545 meet.

The heat flux sensor 10 is provided to the recessed part 54 of the cylinder 52 by a pressing member 40. The recessed part 54 has an opening in the axial end of the cylinder 52. Therefore, the heat flux sensor 10 and the pressing member 40 are respectively inserted into the recessed part 54 from the opening in the axial end of the cylinder 52, and are placed.

The pressing member 40 comprises a plate-like member 41, a contacting member 42, a screw member 43, etc. The plate-like member 41 is formed of a conductor such as metal. The width of the plate-like member 41 is smaller than the width of the rectangular groove 544 and greater than the width of the opening groove 545.

The contacting member 42 is fixed to the heat flux sensor 10.

The screw member 43 is screwed into a screw hole 411 provided in the plate-like member 41. The screw member 43 has a square hole 431 at one axial end thereof, and the other end is in contact with the contacting member 42. The screw member 43 is configured such that a fastening jig such as a square socket wrench is inserted into the square hole 431. The screw member 43 can thereby rotate around its axis. When the screw member 43 rotates in one of the two directions around its axis, the distance between the plate-like member 41 and the contacting member 42 increases. The axial force of the screw member 43 causes the plate-like member 41 to contact the shoulder part 546 of the cylinder 52. The contacting member 42 and the heat flux sensor 10 are pressed against the inner wall of the rectangular groove 544. Thus, the heat flux sensor 10 and the inner wall of the recessed part 54 are brought into close contact. As a result, the heat flow flows well through the inner wall of the recessed part 54, the heat flux sensor 10, and the pressing member 40. Accordingly, the heat flux sensor 10 outputs a signal corresponding to the heat flow (heat flux) passing through in the thickness direction.

Further, the axial force of the screw member 43 causes the plate-like member 41 to contact the shoulder part 546 of the cylinder 52. Thus, the plate-like member 41 and the cylinder 52 are electrically connected. Therefore, the cylinder 52 is electrically connected to the ground 19 via the plate-like member 41. Thus, in the present embodiment, it is possible to reduce the influence of noise generated from the cylinder 52 on the output signal of the heat flux sensor 10.

Fourth Embodiment

The present embodiment will be described with reference to the drawings. This embodiment is also different from the first embodiment in the manner the heat flux sensor 10 is attached. The other aspects are the same as the first embodiment. Therefore, only the parts that are different from the first embodiment will be described below.

Figure 11:
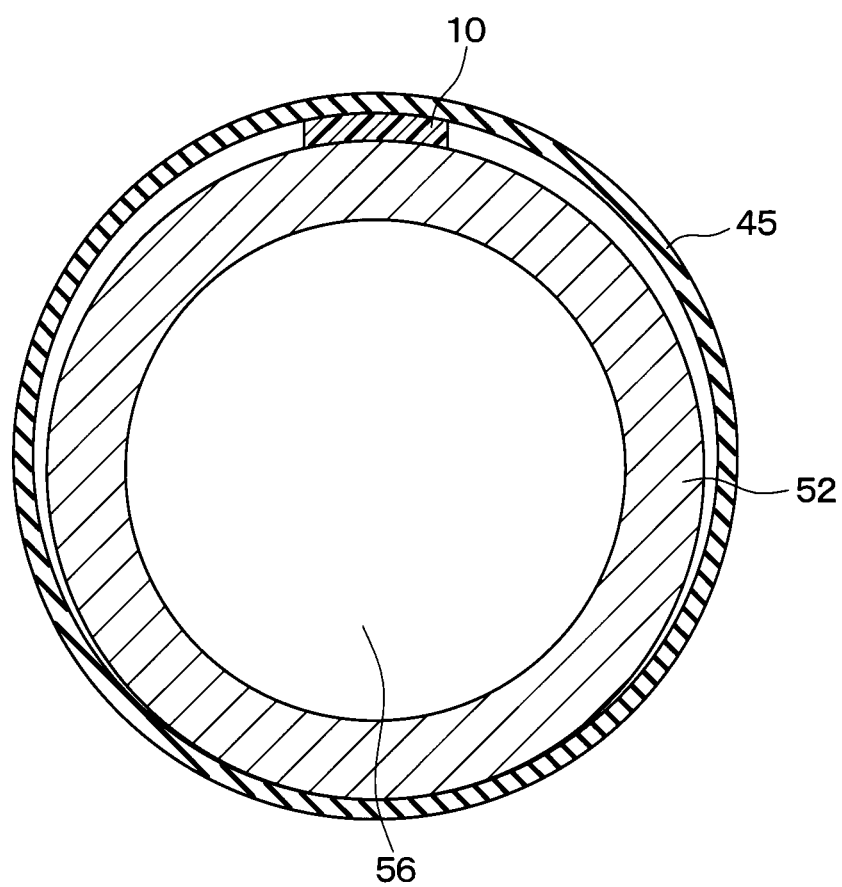
FIG. 11 is a cross-sectional view of the cylinder to which the monitoring device is attached according to the fourth embodiment.

As illustrated in FIG. 11, the cylinder 52 of the present embodiment is a tube-type cylinder (hollow cylinder).

The heat flux sensor 10 is provided to the outer wall of the cylinder 52 by an elastic ring member 45 (for example, a hose band). The heat flux sensor 10 has the flexibility to allow it to curve along the outer wall of the cylinder 52. Thus, the heat flux sensor 10 is brought into close contact with the outer wall of the cylinder 52 by the elastic force of the elastic ring member 45. As a result, the heat flow flows well through the outer wall of the cylinder 52, the heat flux sensor 10, and the elastic ring member 45. Accordingly, the heat flux sensor 10 outputs a signal corresponding to the heat flow (heat flux) passing through in the thickness direction.

Other Embodiments

The technique disclosed herein is not limited to the above embodiments. The technique of the present disclosure may be appropriately altered within the scope of the claims. Specific examples are as follows.

(1) In the above-described embodiments, the air cylinder 50 (target device) is described to be configured such that the piston rod 53 connected to the piston 51 (movable object) moves linearly. However, this is not limiting. In another embodiment, for example, the piston rod 53 may be an apparatus constituting an arm mechanism for supporting the target object 60 via a link mechanism or the like.

(2) In the above-described embodiments, an example has been described where the air cylinder 50 is the target device. However, this is not limiting. In another embodiment, the target device may be, for example, a hydraulic cylinder. The target device may be any device having a chamber 56, 57 to which a fluid for moving a movable body is supplied.

(3) In the above embodiments, the heat flux sensor 10 is attached to the recessed part 54 of the cylinder 52. However, this is not limiting. In another embodiment, for example, the heat flux sensor 10 may be attached to the outer wall of the cylinder 52.

(4) In the above embodiments, the heat flux sensor 10 is attached to the end of the cylinder 52 on the side of the first chamber 56. However, this is not limiting. In another embodiment, for example, the heat flux sensor 10 may be attached to the end of the cylinder 52 on the side of the second chamber 57.

(5) The above described embodiments may be combined as appropriate unless they are irrelevant to each other and obviously cannot be combined. Further, elements composing the above described embodiments are not necessarily required unless it is explicitly described that the element is essential or the element is obviously considered to be essential in principle.

Conclusion

According to a first aspect shown in a part or all of the above embodiments, a monitoring device corresponding to an embodiment of the technique of the present disclosure monitors the movement of a movable object of a target device comprising a tubular cylinder and the movable object which is moved by the pressure of a fluid supplied to a chamber provided inside the cylinder. The monitoring device includes a heat flux sensor and a detection part. The heat flux sensor is provided to the cylinder and detects heat flux generated by compression or expansion of the fluid in the chamber caused in accordance with the movement of the movable object. The detection part detects the moving state of the movable object based on the output signal of the heat flux sensor.

According to a second aspect, the detection part determines whether or not the output signal of the heat flux sensor is within a preset behavior range of the output signal of the heat flux sensor of when the movement is normal.

When the movable object is moving normally, the output signal of the heat flux sensor shows a behavior within a certain range. This makes it possible to preset (store), in the detection part, the behavior range of the output signal of the heat flux sensor of when the movement is normal based on experimental results or the like. Thus, the detection part can detect whether or not the movement of the movable object is normal based on the output signal of the heat flux sensor.

According to a third aspect, the detection part determines that the moving state of the movable object is abnormal when the output signal of the heat flux sensor is greater by a predetermined value or more than the behavior range of the output signal of the heat flux sensor when the moving state of the movable object is normal.

The detection part can detect whether or not the movement of the movable object is abnormal based on the output signal of the heat flux sensor.

According to a fourth aspect, the detection part stores a determined-as-normal region which is the behavior range of the output signal of the heat flux sensor of when the movement is normal, and a determined-as-sign-of-abnormality region which is a region outside the determined-as-normal region and represents the behavior range of the output signal of the heat flux sensor indicative of a sign of abnormality. The detection part determines that the moving state of the movable object is normal when the output signal of the heat flux sensor is within the determined-as-normal region. The detection part determines that the moving state of the movable object is a state showing a sign of abnormality when the output signal of the heat flux sensor is outside the determined-as-normal region and within the determined-as-sign-of-abnormality region. The detection part determines that the moving state of the movable object is abnormal when the output signal of the heat flux sensor is outside the determined-as-normal region and outside the determined-as-sign-of-abnormality region.

It is possible to preset (store), in the detection part, the determined-as-normal region and the determined-as-sign-of-abnormality region based on experimental results or the like. Thus, the detection part can detect whether or not the movement of the movable object is normal based on the output signal of the heat flux sensor. Further, the detection part can determine whether or not the movement of the movable object is a sign of abnormality. Furthermore, the detection part can determine whether or not the movement of the movable object is abnormal.

According to a fifth aspect, the detection part stores an allowable distorted waveform which has been preset based on a waveform of the output signal of the heat flux sensor of when the moving state of the movable object is normal. The detection part determines that the moving state of the movable object is normal when the waveform of the output signal of the heat flux sensor is distorted less than the allowable distorted waveform. The detection part determines that the moving state of the movable object is a state showing a sign of abnormality when the waveform of the output signal of the heat flux sensor is distorted more than the allowable distorted waveform.

When the movable object is moving normally, it performs a constant movement according to the pressure of the fluid supplied to the chamber of the cylinder. This makes it possible to preset, in the detection part, an allowable distorted waveform based on the output signal of the heat flux sensor of when the movement is normal on the basis of experimental results or the like. Thus, the detection part can detect whether or not the movement of the movable object is normal based on the waveform of the output signal of the heat flux sensor.

According to a sixth aspect, further, a warning part is comprised which issues a warning signal based on the determination result of the detection part.

The warning part can notify the user of the monitoring device of the result of acceptance/rejection determination performed on a product, a maintenance warning for the target device, emergency stop of the target device, etc.

According to a seventh aspect, the heat flux sensor is provided in a recessed part recessed from the outer wall of the cylinder toward the chamber.

The heat flux sensor is provided at a position close to the fluid in the chamber which is a heat source. Accordingly, the monitoring device can improve the accuracy of detecting heat flux by the heat flux sensor.

According to an eighth aspect, the inner wall of the recessed part has a curved face, and the heat flux sensor has the flexibility to allow it to curve along the inner wall of the recessed part.

According to the monitoring device, the heat flux sensor and the inner wall of the recessed part are brought into close contact. Accordingly, the monitoring device can improve the detection accuracy of the heat flux sensor.

According to a ninth aspect, the monitoring device comprises a pressing member that presses the heat flux sensor against the inner wall of the recessed part.

No gap is formed between the heat flux sensor and the inner wall of the recessed part (generation of a gap can be prevented).

According to a tenth aspect, in the monitoring device, the cylinder and the pressing member are in contact with each other, and the cylinder is electrically connected to the ground via the pressing member.

The monitoring device can reduce the influence of noise generated from the cylinder on the output signal of the heat flux sensor. Thus, even when the cylinder is small and has a chamber with a small volume, the monitoring device can monitor the moving state of the movable object based on the output signal of the heat flux sensor.

REFERENCE SIGNS LIST

1 . . . Monitoring device
10 . . . Heat flux sensor
11 . . . Voltmeter
12 . . . Control unit
13 . . . Detection part
50 . . . Air cylinder (target device)
51 . . . Piston (movable object)
52 . . . Cylinder
56, 57 . . . Chamber

What is claimed is:

1. A monitoring device configured to monitor movement of a movable object of a target device, the target device comprising a tubular cylinder and the movable object which is moved by pressure of a fluid supplied to a chamber provided inside the cylinder, the monitoring device comprising:
   a heat flux sensor provided to the cylinder to detect heat flux that flows between inside and outside of the cylinder due to compression or expansion of the fluid in the chamber caused in accordance with the movement of the movable object; and
   a detection part which detects a moving state of the movable object based on an output signal of the heat flux sensor.

2. The monitoring device according to claim 1, wherein the detection part determines whether or not the output signal of the heat flux sensor is within a behavior range of the output signal of the heat flux sensor of when the moving state of the movable object is normal.

3. The monitoring device according to claim 1, wherein the detection part determines that the moving state of the movable object is abnormal when the output signal of the heat flux sensor is greater by a predetermined value or more than the behavior range of the output signal of the heat flux sensor of when the moving state of the movable object is normal.

4. The monitoring device according to claim 1, wherein the detection part
stores a determined-as-normal region which represents the behavior range of the output signal of the heat flux sensor of when the moving state of the movable object is normal, and a determined-as-sign-of-abnormality region which is a region outside the determined-as-normal region and represents the behavior range of the output signal of the heat flux sensor of when the moving state of the movable object is a sign of abnormality,
determines that the moving state of the movable object is normal when the output signal of the heat flux sensor is within the determined-as-normal region,
determines that the moving state of the movable object is a state showing a sign of abnormality when the output signal of the heat flux sensor is outside the determined-as-normal region and within the determined-as-sign-of-abnormality region, and
determines that the moving state of the movable object is abnormal when the output signal of the heat flux sensor is outside the determined-as-normal region and outside the determined-as-sign-of-abnormality region.

5. The monitoring device according to claim 1, wherein the detection part
stores an allowable distorted waveform which is preset based on a waveform of the output signal of the heat flux sensor of when the moving state of the movable object is normal,
determines that the moving state of the movable object is normal when the waveform of the output signal of the heat flux sensor is distorted less than the allowable distorted waveform, and
determines that the moving state of the movable object is a state showing a sign of abnormality when the waveform of the output signal of the heat flux sensor is distorted more than the allowable distorted waveform.

6. The monitoring device according to claim 1, further comprising a warning part which issues a warning signal based on a determination result of the detection part.

7. The monitoring device according to claim 1, wherein the heat flux sensor is provided in a recessed part recessed from an outer wall of the cylinder toward the chamber.

8. The monitoring device according to claim 7, wherein an inner wall of the recessed part has a curved face, and the heat flux sensor has a flexibility that allows the heat flux sensor to curve along the inner wall of the recessed part.

9. The monitoring device according to claim 7, further comprising a pressing member which presses the heat flux sensor against an inner wall of the recessed part.

10. The monitoring device according to claim 9, wherein the pressing member presses the heat flux sensor against the inner wall of the recessed part, and a part of the pressing member is in contact with the cylinder, and
the cylinder is electrically connected to the ground via the pressing member.

11. The monitoring device according to claim 1, further comprising an elastic ring member which presses the heat flux sensor against an outer wall of the cylinder.

* * * * *